United States Patent [19]

Sasaki

[11] Patent Number: 5,102,471
[45] Date of Patent: Apr. 7, 1992

[54] PORTABLE MEASURING INSTRUMENT WITH SOLAR BATTERIES

[75] Inventor: Koji Sasaki, Kawasaki, Japan
[73] Assignee: Mitutoyo Corporation, Tokyo, Japan
[21] Appl. No.: 662,551
[22] Filed: Feb. 28, 1991
[30] Foreign Application Priority Data Mar. 2, 1990 [JP] Japan .................................. 2-51302

[51] Int. Cl.⁵ .......................................... H01L 31/042
[52] U.S. Cl. ................................. 136/244; 136/251;
136/291; 33/819; 33/820
[58] Field of Search ...................... 136/244, 291, 251;
33/819, 820

[56] References Cited

U.S. PATENT DOCUMENTS 4,542,295 9/1985 Mattson et al. .................. 250/352

FOREIGN PATENT DOCUMENTS

| 0319941 | 6/1989 | European Pat. Off. | 136/293 |
| 59-84478 | 5/1984 | Japan | 136/244 |
| 59-121982 | 7/1984 | Japan | 136/244 |
| 60-147170 | 8/1985 | Japan | 136/244 |
| 1-81507 | 5/1989 | Japan . | |

*Primary Examiner*—Aaron Weisstuch
*Attorney, Agent, or Firm*—Oliff & Berridge

[57] ABSTRACT

In a portable measuring instrument using as a power source a group of solar batteries in which a plurality of solar batteries are series-connected on the same plane, respective light receiving windows are made to be substantially equal in area to one another, and each of the light receiving windows surrounds the outer periphery of other light receiving windows adjacent thereto, whereby, even if part of the light which irradiates the light receiving windows of the solar batteries is screened by a hand or other holding means for operating and holding the portable measuring instrument, it is avoided that only a specific light receiving window is screened, so that a current of the group of solar batteries can be efficiently produced.

3 Claims, 5 Drawing Sheets

FIG.1
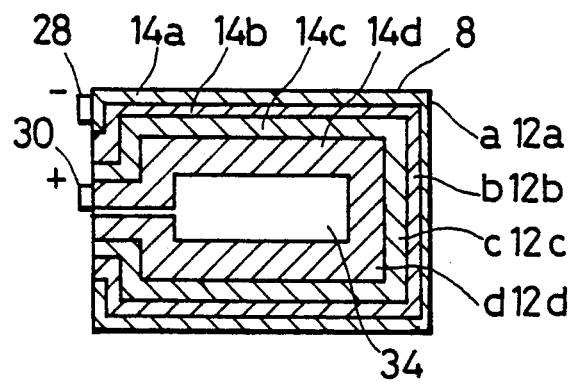
FIG.3A PRIOR ART
FIG.3B PRIOR ART
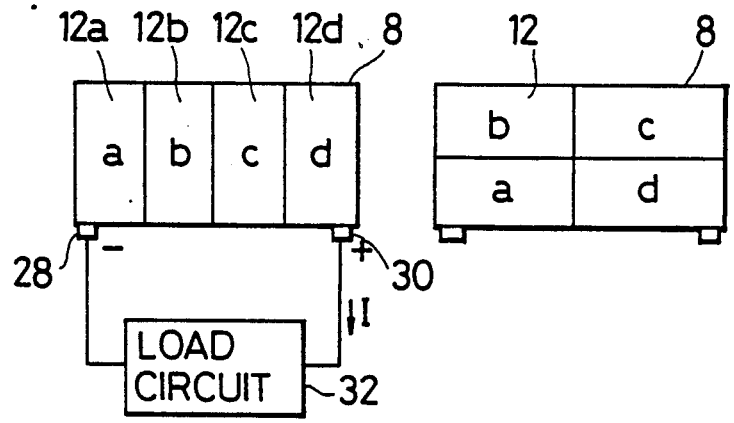
FIG.3C PRIOR ART
FIG.3D PRIOR ART
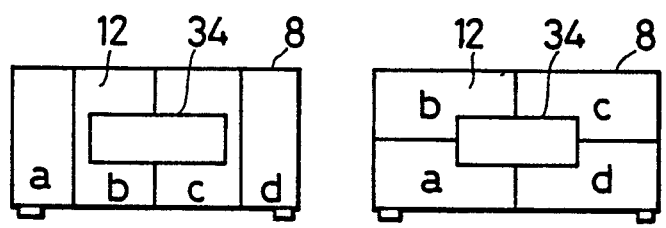

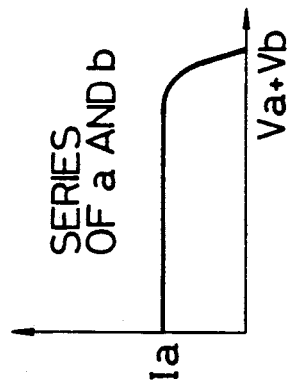
FIG. 6C
PRIOR ART
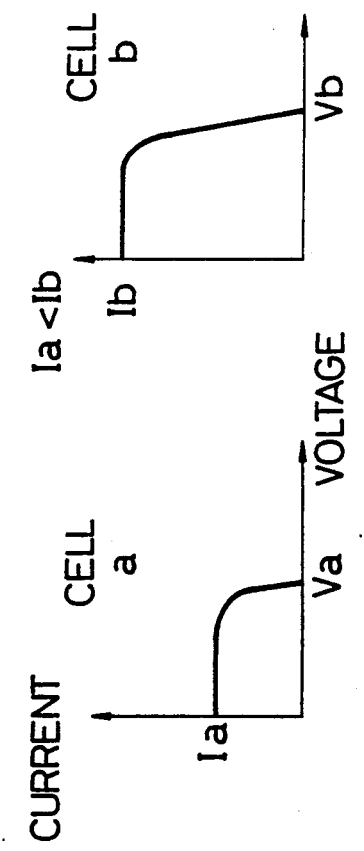
FIG. 6B
PRIOR ART
FIG. 6A
PRIOR ART

PORTABLE MEASURING INSTRUMENT WITH SOLAR BATTERIES

BACKGROUND OF THE INVENTION

1. Field of the Invention

The present invention relates to improvements in a portable measuring instrument which utilizes as a power source a group of solar batteries, in which a plurality of said solar batteries are series-connected on the same plane.

2. Description of the Prior Art

Solar batteries have previously been utilized as a power source for portable measuring instruments such as a slide caliper and a micrometer (see, for example, Japanese Patent Application No. 1340/1990 filed by the present applicant).

In general, when solar batteries are utilized as a power source for a portable measuring instrument, usually a plurality of single cells of solar batteries are series-connected in order to provide a voltage level required for powering the portable measuring instrument.

FIGS. 3A through 3D show conventional arrangements in which four solar batteries 12 formed of single cells including a cell 'a', 12a, a cell 'b', 12b, a cell 'c', 12c, and a cell 'd', 12d are series-connected. In FIG. 3A, the cell 'a', 12a, is connected to the cell 'b', 12b, the cell 'b', 12b, to the cell 'c', 12c, and the cell 'c', 12c, to the cell 'd', 12d. Thus, as a whole, the four solar batteries 12 are series-connected. A negative electrode terminal 28 is disposed at one end of the cell 'a', 12a, and a positive electrode terminal 30 at one end of the cell 'd', 12d. Connected to the positive electrode terminal 30 and the negative electrode terminal 28 is a load circuit 32, through which a current I flows. Connection and function in FIGS. 3B through 3D are the same as in the above.

In general, it is known that, when a plurality of solar batteries 12 formed of the single cells are series-connected, the magnitude of the current I flowing through the load circuit 32 is determined by the amount of current in the cell of solar battery 12 where the minimal current flows. FIGS. 6A through 6C show the above-described fact. FIGS. 6A and 6B show the relationship between the current and the voltage in the solar batteries when the cell 'a' and cell 'b', in their single states, have maximal electromotive voltages of Va, Vb and maximal currents Ia, Ib, respectively. When the cell 'a' and the cell 'b' are series-connected as shown in FIG. 6C, the maximal voltage is Va+Vb, while the maximal current is Ia. Part of the current Ib−Ia is consumed as the heat loss by recombination by electrons and holes.

FIG. 4 shows a conventional example in which a group 8 of solar batteries series-connected as shown in FIG. 3 are mounted on a slide caliper 60 as an example of a portable measuring instrument 10. The slide caliper 60 has an electrostatic capacity type position sensor (see, for example, Japanese Patent Laid-Open No. 212711/1984 filed by the present applicant). The slide caliper 60 has a slider part 46, slide caliper 60 being slidable on a fixed stem having fixed part 44 arranged thereon with the fixed stem having electrodes, not shown, of a predetermined pitch. On slide caliper 60 is mounted electrodes, not shown, of a predetermined pitch, which are opposed to electrodes of the fixed stem, a load circuit (see FIG. 3A) for driving the electrodes and processing a measuring signal, and a group 8 of solar batteries serving as a power source for supplying current to the load circuit. A display 34 is disposed in the central portion of the group 8 of solar batters. Designated at 40 is an on/off switch for operating the power source and 42 is a ZERO switch for zero-setting an original point of measuring. Denoted at 48A is a projection to be pressed by a hand 16 or the like for moving the slider part 46, and 48B a rotating wheel for moving the slider part 46 relative to fixed part 44.

Furthermore, FIG. 5 shows a conventional example in which the group 8 of solar batteries series-connected as shown in FIGS. 3A through 3D are mounted on a micrometer 62 as an example of the portable measuring instrument 10.

When thimble 68 is rotated, spindle 66 is advanced, whereby the distance between the spindle 66 and an anvil 64 is measured.

Designated at 34 is a display for displaying the result of measuring and 8 designates the group of solar batteries.

However, there has heretofore been the problem that part of the light which irradiates the light receiving windows of the solar batteries 12 are screened by the hand 16 or other means for operating and holding the portable measuring instrument 10.

Namely, when part of the light which irradiates the windows to group 8 of solar batteries is screened by the hand 16 or the like as shown in FIGS. 4 or 5, a light screened region 50 is formed on the light receiving windows of the group 8 of solar batteries. In the arrangements of the group 8 of solar batteries as shown in FIGS. 3A through 3D, the light screened region 50 is not substantially uniformly distributed onto the respective light receiving windows and is biased only to a specific light receiving window of the solar batteries 12.

As a result, assuming that the intensities of the irradiating light are uniform at the locations of the light receiving windows, the current I of the group 8 of solar batteries, with which the screened solar battery 12 is series-connected, is governed by the current of the most screened solar battery 12, which has the least current of all the series-connected solar batteries 12. For this reason, there has heretofore been the problem that only a specific light receiving window is significantly subjected to the influence of light screening by the hand 16 or the like for operating and holding the portable measuring instrument 10, so that the current I of the group 8 of the series-connected solar batteries as a whole is greatly reduced.

SUMMARY OF THE INVENTION

The present invention has been developed to obviate the above-described problem and has as its object the provision of a portable measuring instrument 10 using as a power source the group 8 of solar batteries, in which the plurality of solar batteries 12 are series-connected, wherein light screening of a specific light receiving window by the hand 16 or the like for operating and holding the portable type measuring instrument 10 is avoided, so that the current I of the group 8 of the solar batteries can be efficiently obtained.

To solve the above-described problem, the present invention is characterized in that, in a portable measuring instrument using as a power source a group of solar batteries in which the plurality of solar batteries are series-connected on the same plane, the respective light receiving windows are made substantially equal in area to one another, and each of the light receiving windows surrounds the outer periphery of the other light receiving window adjacent thereto.

In a portable measuring instrument using as a power source a group of solar batteries in which the plurality of solar batteries are series-connected on the same plane, the respective light receiving windows are made substantially equal in area, and each of the light receiving windows surrounds the periphery of the light receiving window adjacent thereto, whereby, even if part the light which irradiates the light receiving window of the solar batteries is screened by the hand or other holding means for operating and holding the portable measuring instrument, it is avoided that only a specific light receiving window is screened, so that the current I of the group of solar batteries can be efficiently obtained.

BRIEF DESCRIPTION OF THE DRAWINGS

The preferred embodiments will be described with reference to the drawings, wherein like elements have been denoted throughout the figures with the like reference numerals, and wherein:

FIG. 1 is a plan view showing the group of solar batteries used in an embodiment of the present invention;

FIGS. 3A through 3D are block diagrams showing the conventional arrangements of groups of solar batteries;

FIGS. 6A through 6C are graphic charts showing the relationship between the voltage and current when a plurality of solar batteries are series-connected.

DESCRIPTION OF THE PREFERRED EMBODIMENT

Figure 2:
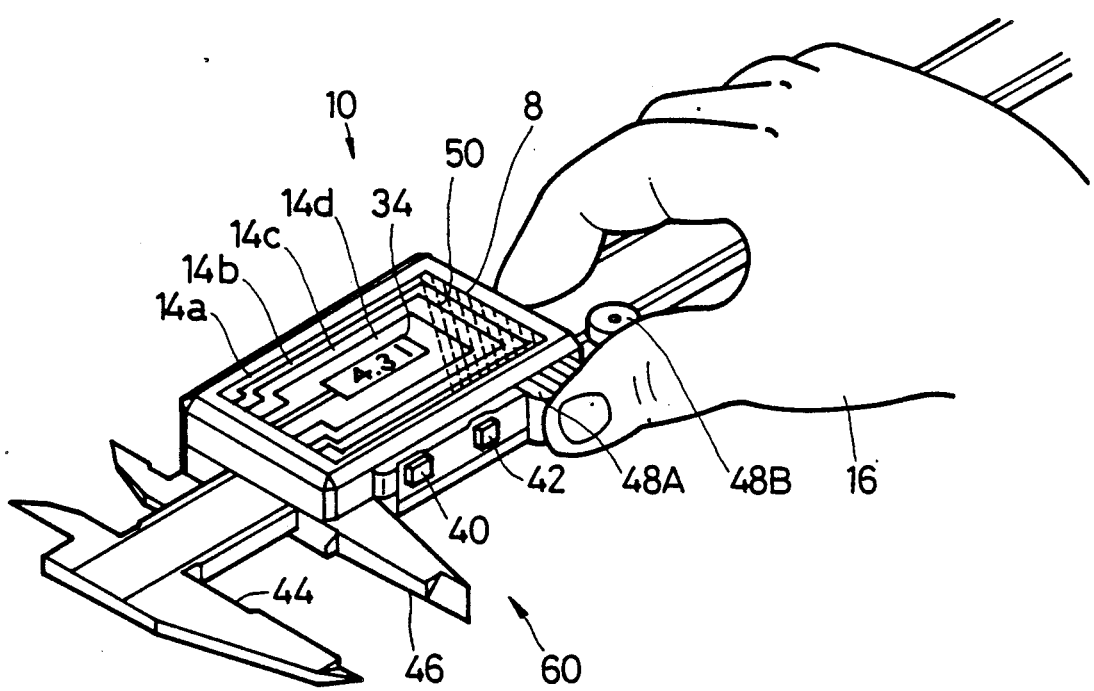
FIG. 2 shows the appearance of an embodiment of the present invention.

A preferred embodiment of the present invention will hereunder be described in detail with reference to the drawings. However, the present invention should not necessarily be limited to this embodiment.

FIG. 1 shows an example of the arrangement of a group 8 of solar batteries in which the plurality of solar batteries 12 are series-connected on the same plane.

The cell 'a', 12a, the cell 'b', 12b, the cell 'c', 12c, and the cell 'd', 12d, are solar batteries each formed of a single cell. The cell 'a', 12a, is connected to the cell 'b', 12b, the cell 'b', 12b to the cell 'c', 12c, the cell 'c', 12c to the cell 'd', 12d, respectively. Thus, as a whole, four solar batteries 12 are series connected. A negative electrode terminal 28 is connected to the cell 'a', 12a and a positive electrode terminal 30 to the cell 'd', 12d, respectively. Furthermore, denoted at 34 is a display portion for displaying the results of measuring by the portable measuring instrument 10.

The cell 'a', 12a, the cell 'b', 12b, the cell 'c', 12c, and the cell 'd', 12d have light receiving windows 14a, 14b, 14c, and 14d, respectively. The light receiving window 14d of the cell 'd', 12d is formed to provide a loop surrounding the display portion 34, the light receiving window 14c of the cell 12c surrounds the outer periphery of the light receiving window 14d, the light receiving window 14b surrounds the outer periphery of the light receiving window 14c, and the light receiving window 14a surrounds the outer periphery of the light receiving window 14b. The light receiving windows 14a, 14b, 14c, and 14d are substantially equal in area to one another. To make the areas of the respective light windows 14 substantially equal to one another, the lateral widths of the light receiving windows 14 disposed on the outer periphery of the light receiving windows 14 are made smaller than the lateral widths of those disposed on the inner periphery.

FIG. 2 shows an embodiment of the present invention, in which the group 8 of the solar batteries shown in FIG. 1 are mounted. The portable measuring instrument 10 in this embodiment has a slide caliper 60 which has an electrostatic capacity type position sensor (see, for example, Japanese Patent Laid-Open No. 212711/1984 filed by the present applicant).

The slide caliper 60 has a slider part 46, the slide caliper being slidable on the fixed stem having fixed part 44 arranged thereon with the fixed stem having electrodes, not shown, of a predetermined pitch. On slide caliper 60 is mounted electrodes, not shown, of a predetermined pitch, which are opposed to the electrodes of the fixed stem, a load circuit (see FIG. 3A) for driving the electrodes and processing a measuring signal, and the group 8 of the solar batteries serving as the power source for supplying current to the load circuit. The display 34 for displaying the results of measuring is disposed in the central portion of the group 8 of solar batteries.

Designated at 40 is an on-off switch for operating the power source and 42 is a ZERO switch for zero-setting the original point of measuring. Denoted at 48A is the projection to be pressed when the slider part 46 is moved by a hand 16 or the like and 48B a rotating wheel for moving the slider part 46 relative to fixed part 44.

Operation of this embodiment will now be described.

Figure 4:
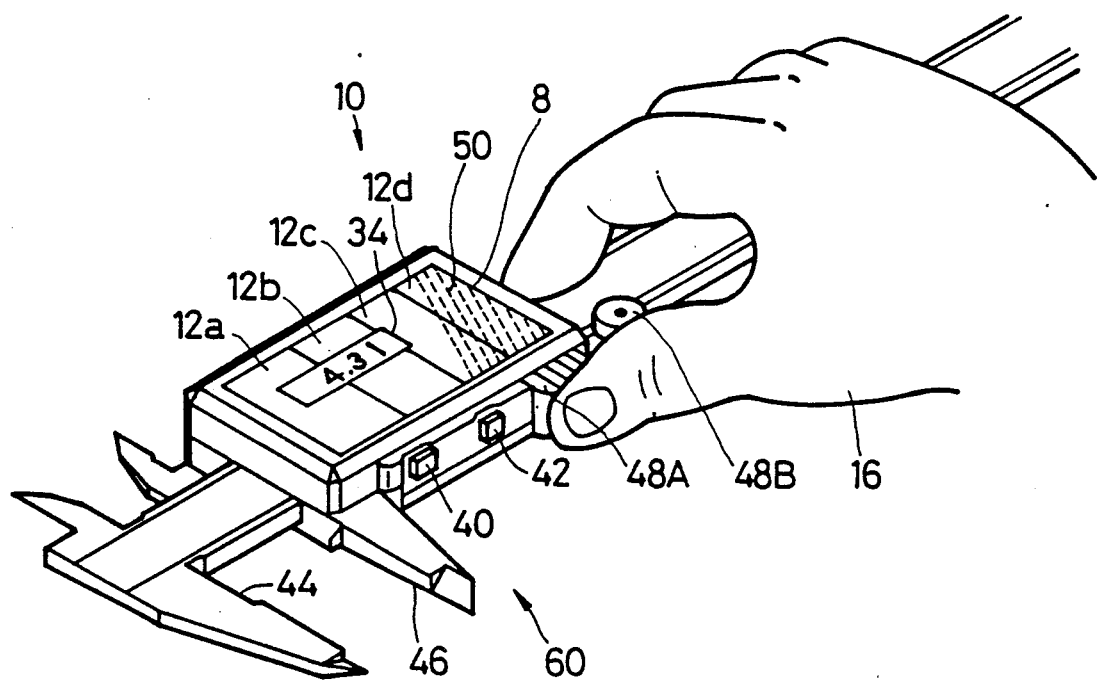
FIG. 4 shows the appearance of the conventional slide caliper.

A thumb is applied to the projection 48A and the wheel 48B, other fingers are placed along the fixed stem whereby the slide caliper 60 is operated and held by the hand 16. When light for irradiating the light receiving windows 14 impinges from a direction opposite to the side where the light receiving windows 14 are located with respect to the hand 16, a light screened region 50 as indicated by oblique lines shown in FIG. 2 is formed on the light receiving windows 14. For easier comparison, assumption is made that this light screened region 50 is formed in the same manner as in the conventional example shown in FIG. 4.

However, in this embodiment, the light receiving windows 14 are provided surrounding the outer peripheries of other light receiving windows 14, so that screening of only a specific light receiving window 14 is avoided. Namely, the farther out the outermost position a light receiving window 14 (for example, 14a) is located, the larger will be the screened area of the light receiving window 14. However, the further out the light receiving window 14 (for example, 14a) is located, the longer and thinner the outer periphery thereof becomes, so that the amount of screened area of the light receiving window 14 on the outer side is not much different from that for the light receiving window 14 on the innermost side (for example, 14d). The above fact is combined with the fact that the respective light receiving windows 14 are made to be substantially equal in area to one another, so that the respective cells constituting the group 8 of solar batteries can produce substantially the same amounts of current. As a result, the current I of the group 8 of solar batteries can be efficiently produced, so that a slide caliper 60 with solar batteries, capable of efficiently supplying the current I of the group 8 of solar batteries, can be provided.

Figure 5:
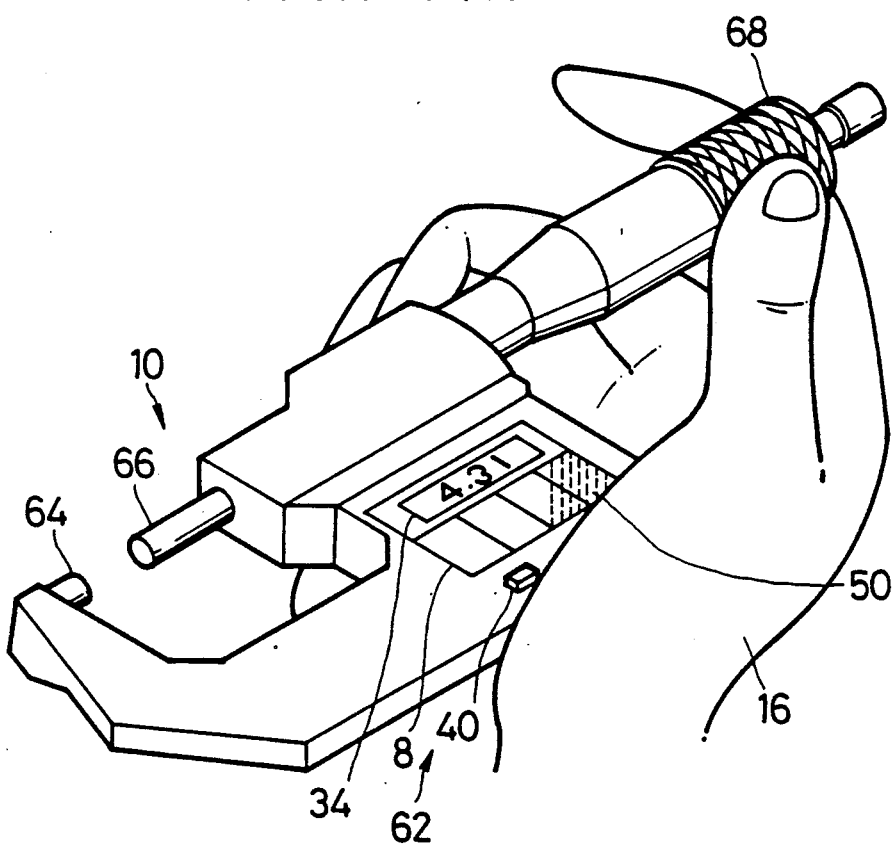

As has been described hereinabove, the slide caliper 60 has been described as the embodiment of the present invention. However, the group 8 of solar batteries shown in FIG. 1 may be mounted on the micrometer 62 shown in FIG. 5, so that a micrometer 62 with the solar batteries, capable of efficiently supplying the current I of the group 8 of solar batteries, can be provided similarly.

Furthermore, the arrangement of the group 8 of solar batteries used in the embodiment of the present invention, in which the plurality of solar batteries 12 are series-connected on the same plane should not be limited to the exemplary arrangement shown in FIG. 1. For example, not only this case where the display portion 34 is not disposed in the central portion of the group 8 of solar batteries, but also the case where the display portion 34 is disposed outside the loop of the solar battery 12 may be employed.

What is claimed is:

1. A portable measuring instrument using as a power source a group of solar batteries, in which a plurality of solar batteries are series-connected on the same plane, wherein light receiving windows corresponding to respective ones of the plurality of solar batteries are made to be substantially equal in area to one another, and each of the light receiving windows outside of an innermost light receiving window surrounds the outer periphery of a light receiving window adjacent thereto.

2. The portable measuring instrument as set forth in claim 1, wherein, to make the respective light receiving windows equal in area to one another, the lateral widths of the light receiving windows on the outer peripheries are progressively made smaller than those on the inner peripheries.

3. The portable measuring instrument as set forth in claim 1, wherein the innermost light receiving window is formed to provide a loop surrounding a display portion for displaying the results of measuring.

* * * * *